Feb. 2, 1943.    J. T. RUIST    2,309,985

TREADLE ROLLS FOR LOOMS

Filed Oct. 25, 1941

Inventor
John Ture Ruist.
By: Howson and Howson,
Attorneys.

Patented Feb. 2, 1943

2,309,985

UNITED STATES PATENT OFFICE 2,309,985

TREADLE ROLL FOR LOOMS

John Ture Ruist, Goteborg, Sweden, assignor to SKF Industries, Inc., Philadelphia, Pa., a corporation of Delaware Application October 25, 1941, Serial No. 416,563
In Sweden November 8, 1940

2 Claims. (Cl. 139—79)

The present invention relates to treadle rolls or excenter rolls for looms and the like and specifically treadle rolls mounted on ball or roller bearings. In earlier types of treadle rolls foreign substance such as threads, cotton waste and the like have entered the bearings with the result that the bearings have become overheated with consequent risk of ignition and fire. In order to avoid this risk permanent seals are provided according to the invention between the inner and outer race rings of the bearings at both sides of the bearings and in order to permit of lubrication of the bearings a lubricant admission channel is provided to the bearing through the inner race ring. The interior of a bearing according to the invention is well protected and can be easily kept filled with lubricant which increases the efficiency of the seal.

Figure 1:
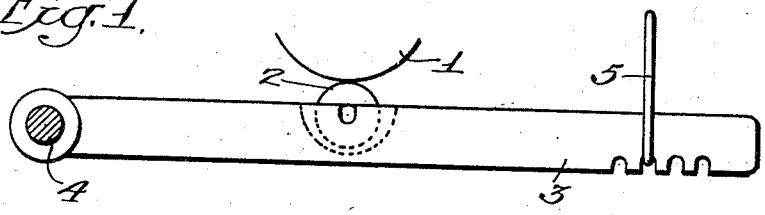
Figure 2:
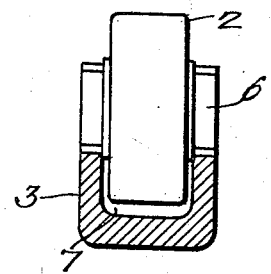
Figure 3:
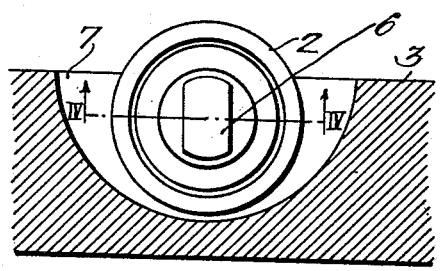
Figure 4:
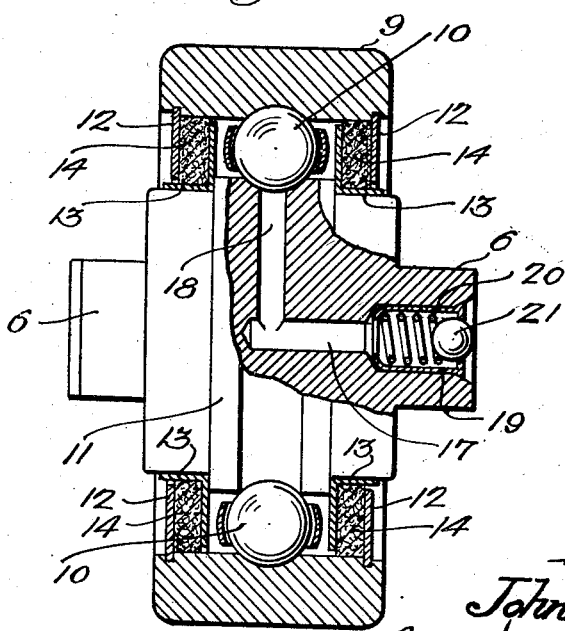

An embodiment of the improvement according to the invention is illustrated in the accompanying drawing. Fig. 1 shows a loom treadle, and Figs. 2 and 3 show on a larger scale a cross section through the treadle and a partial section in a longitudinal direction through the treadle with the treadle roll. Fig. 4 finally shows on a still greater scale a partial section of the treadle roll and its bearing along the line IV—IV in Fig. 3.

In Fig. 1 the cam is indicated at 1. This cam actuates the treadle roll 2 which is carried by the treadle 3. The treadle 3 is oscillatable about the shaft 4 and connected at its other end to a cable 5. Upon rotation of the cam 1 an oscillating movement will be imparted to the treadle 3 to cause it to oscillate to and fro about the axle 4 thereby imparting through the cable a reciprocating up and down movement to the shafts, (not shown).

As is apparent from Figs. 2 and 3, the treadle roll 2 is mounted on an axle 6 having flattened ends to fit into grooves in the side walls of a pocket 7 in the treadle 3. The axle 6 is therefore non-rotatable, while the outer part of the treadle roll rotates under the action of the cam 1.

During the operation of the loom threads, cotton waste, etc., collect and wind themselves about the axle 6.

The design of the roller which in Figs. 1–3 has been designated generally by the numeral 2 is shown on a larger scale in the partial section shown in Fig. 4. In this figure the numeral 9 designates the actual roller which in the form of the invention shown forms the outer race ring of a single row deep groove ball bearing. The roller 9 is rotatably mounted on an inner bearing member 11 through the intermediary of a number of balls 10. The inner bearing member 11 in the embodiment shown is made in a single piece with the axle 6. In order to protect the interior of the bearing from the entrance of foreign matter, seals are provided between the outer bearing member 9 and the inner bearing member 11 at both sides of the bearing.

Each seal comprises a sealing plate 12 mounted in the outer race ring 9, a sealing plate 13 mounted on the inner bearing member 11 and a ring 14 of felt or similar material enclosed between the sealing plate. The sealing plate 12 is wedged into an internal groove in the outer bearing member 9 and is retained by its own elasticity, and the sealing plate 13 is mounted with a tight fit on the inner bearing member. The felt ring is held loosely between the two sealing plates.

In order to permit lubrication of the bearing a lubricant channel 17, 18, is provided in the shaft 6. Since the inner race ring of the bearing is made in the same piece as the shaft, all risk that the lubricant channel may be cut off through a relative rotation between the inner race ring and the shaft is avoided. In order that the seals may be effective the width in the direction of the shaft must not be too small. For this reason the space available for the entrance of the lubricant channel into the bearing is limited. The mouth of this channel as is apparent in Fig. 4 has therefore been located at the inner race of the bearing. In order to avoid shocks as the balls pass the mouth of the channel the radial channel 18 is directed perpendicular to the flat surfaces of the ends of the shaft 6. The mouth will therefore be located in the unloaded zone of the race and all risk of shocks is eliminated.

A non-return valve is provided at the entrance to the lubricant channel comprising a sleeve 19, a spring 20 and a ball 21. The lubricant which is preferably grease is forced in by means of a grease gun in such a quantity that the interior of the bearing is entirely filled with lubricant.

The embodiment described above can be modified in many different ways without departing from the spirit of the invention. For example the sealing plate 12 can be replaced by a sealing plate having L-shaped profile pressed into an enlargement of the bore of the outer race ring. The single row deep groove ball bearing shown can be replaced by a two-row ball bearing or by a one- or two-row roller bearing or by a needle bearing.

Having thus described my invention, I claim and desire to secure by Letters Patent the following:

1. A treadle roll for looms comprising an outer member and an inner member, each of said members having a raceway formed therein, a series of antifriction bearing members between the said members, seals closing the space between the outer and inner members at both sides of the roll, the said inner member being made integral with an axle, means for determining the angular position of the inner member of the roll in the treadle, there being a lubricant channel formed in the inner bearing member and leading to the unloaded zone of the interior of the bearing.

2. A treadle roll for looms comprising an outer member and an inner member, said inner member having projecting side portions of non-circular form for fixing the member non-rotatably in the treadle, a central relatively fixed cylindrical portion of major diameter and a cylindrical portion of lesser diameter at each side of the central portion, seals closing the space between the outer and inner members at both sides of the roll, said seals being seated on the said cylindrical portions of lesser diameter and bearing against the sides of the said central portion and comprising also retaining elements interlocked with the outer member, a series of anti-friction bearing elements between the members, said outer and inner members having raceways for said elements, and said inner bearing member having a lubricant channel extending from an exterior surface thereof to the space between said seals.

JOHN TURE RUIST.